Figure 2:
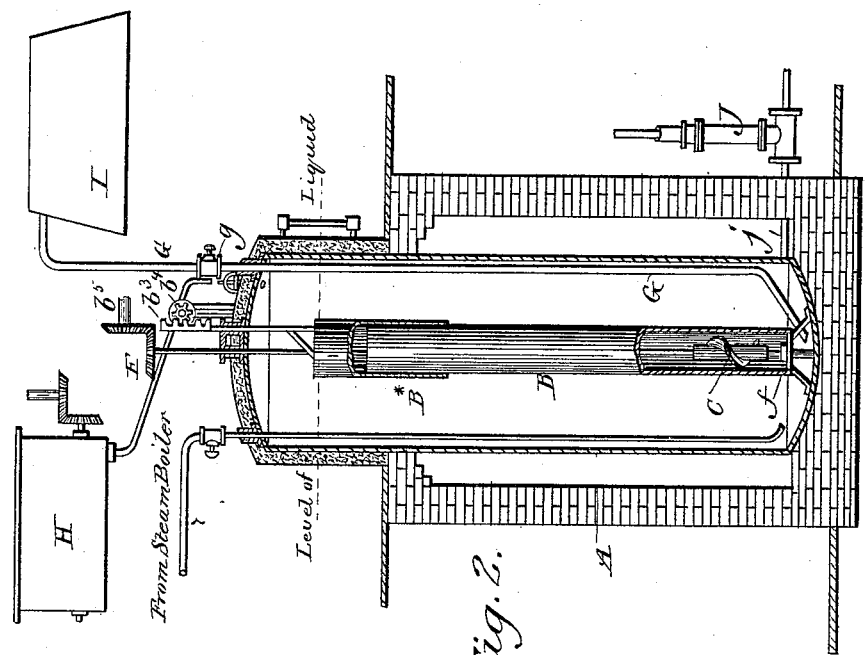

(No Model.)

N. M. BELL.
ART OF MANUFACTURING BORAX.

No. 449,064. Patented Mar. 24, 1891.

Witnesses
A. B. Buchanan
J. J. F. Johnson

Inventor
Newton M. Bell
Per J. N. Kalb Associate
For Smith & Osborn
His Attorneys.

UNITED STATES PATENT OFFICE.

NEWTON M. BELL, OF SAN FRANCISCO, CALIFORNIA.

ART OF MANUFACTURING BORAX.

SPECIFICATION forming part of Letters Patent No. 449,064, dated March 24, 1891.

Application filed March 26, 1890. Serial No. 345,321. (No model.)

*To all whom it may concern:*

Be it known that I, NEWTON M. BELL, a citizen of the United States, residing in the city and county of San Francisco and State of California, have invented certain new and useful Improvements in the Art of Manufacturing Borax from Borate of Lime, of which the following is a specification.

My invention relates to improvements in the production and manufacture of borax from the natural product borate of lime; and it has for its object to simplify the manufacture to such an extent that the expense attending the same will be considerably reduced, and this valuable and widely-used product can be supplied of excellent quality at less cost than heretofore.

Under the present methods or processes the borax of commerce is obtained by boiling the natural substance known as "borate of lime" in a solution of carbonate of soda and water until, by the processes of decomposition, reaction, and chemical combination, the two substances are converted into carbonate of lime and borate of soda, the former an insoluble body and the latter existing in the form of a solution from which the borax is obtained by crystallization after the lime product has been removed by precipitation. The operation of boiling to decompose the two substances is carried on in an ordinary boiler in which the solution of carbonate of soda is placed, and the borate of lime is introduced after being reduced by special grinding to a fine powder. Such special reduction of the borates to powder is required by many of the borates of lime as found in different localities because of their refractory character and that better decomposition and less waste may be secured in the process. It has been the practice, also, to employ a solution of carbonate of soda of much greater strength than that which would be required to supply the proper quantity of carbonic acid for a given quantity of borate of lime, as the decomposition is considerably accelerated by such excess.

As an improvement on these methods or processes, my present invention is intended, first, to secure thorough decomposition of the substances and to render the manufacture of borax from borate of lime more rapid, more simple, and less expensive, whereby I am enabled to place the manufactured product on the market at less cost to the consumer. It is intended, secondly, to facilitate the manufacture of the product from the more refractory grades or qualities of the natural substance borate of lime.

The essential part or feature of my invention consists in boiling the mixture of borate of lime and carbonate of soda in a closed vessel under considerable degree of pressure, the mixture being kept in a state of agitation or circulation by suitable mechanical means during the operation. The vessel should be capable of standing the pressure of one hundred and fifty pounds, or thereabout, to the square inch. In addition to the mechanical agitator it is furnished with the usual pressure-gages and valves for controlling and regulating the pressure. A closed vessel with a furnace beneath it may be used to carry on the operation, or a vessel in the form of a digester having connection with a steam-boiler, from which a sufficient supply of steam to maintain the required pressure in the vessel may also be used. In the one case steam will be generated directly in the vessel and in the other the steam-pressure will be obtained from a source of supply outside. Two such forms of apparatus for carrying on the operation under pressure are illustrated in the accompanying drawings, of which—

Figure 1:
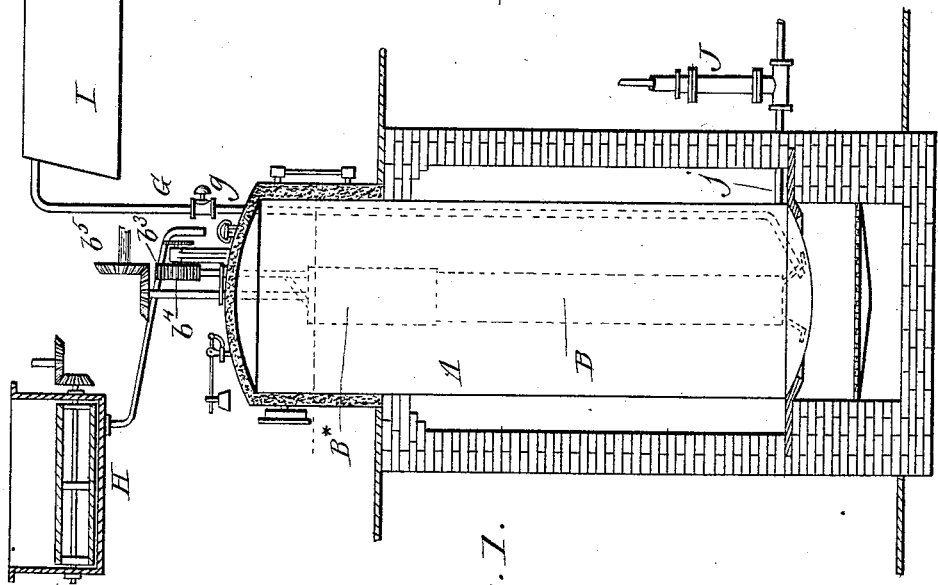

Figure 1 represents the steam-tight vessel with a furnace beneath it, and Fig. 2 shows an arrangement of digester having connection with a separate steam-generator.

Another part or feature of the present invention has for its object to dispense with the special grinding of the more refractory varieties of borates of lime which has heretofore been resorted to as a means of accelerating decomposition and reducing the percentage of waste or loss in the subsequent operations, and this part of the improvement consists in sorting the borate of lime as it comes from the usual preliminary grinding or crushing operation into separate grades or portions of coarser particles and finer particles, then introducing the coarser particles into the carbonate-of-soda solution, which is made of the full strength that would be employed for the whole charge or quantity of the borates if treated at the one time, and afterward introducing the finer particles into the mixture while the operation of boiling is going on. By such means I obtain rapid and thorough decomposition and a consequent complete combination of the elements without the labor and expense of reducing the borates to fine powder.

In the manufacture of borax from the natural product or substance borate of lime as at present carried on the quantity of soda that is required for a given quantity of borates is determined, as is well known, by the percentage of lime contained in the borates and the percentage of carbonic acid contained in the carbonate of soda being used. Thus a grade of borate of lime containing, say, about forty per cent. anhydrous boracic acid and twenty-one and thirty-three one-hundredths per cent. of lime, in combination with water of crystallization and foreign substances, would be a common form of borates at present found in some localities, and a charge of about five thousand pounds of such grade of borates would contain about two thousand pounds anhydrous boracic acid, about ten hundred and sixty-six fifty one-hundredths pounds of lime in combination, about nineteen hundred and thirty-three fifty one-hundredths pounds water of crystallization and foreign substances. For such quantity of borates of the character mentioned I should use about two thousand two hundred pounds of carbonate of soda to furnish the quantity of carbonic acid required in the operation. This quantity of carbonate of soda is but little, if any, in excess of the theoretical proportion required, and will give a solution of much lower degree of strength than has heretofore been used in treating the natural product, for by working under pressure the operations and processes of decomposition, reaction, and combination are carried on under such advantageous conditions that the solution of the reagent employed may be but little in excess of the theoretical proportions. The whole quantity of carbonate of soda is first dissolved in about eight hundred to ten hundred gallons of water, and in this solution the charge of five thousand pounds of borates is introduced. The whole being thoroughly mixed, it is run into the boiler or digester and all openings tightly closed. The mixture is then boiled under a pressure of from seventy-five to one hundred and fifty pounds per square inch, the pressure being maintained by turning in steam from a generator outside, as in the form of apparatus represented in Fig. 2, or by applying heat directly to the body of liquid in the vessel to a degree sufficient to develop and maintain the desired steam-pressure in and upon the contents. This operation is continued for a period of from two to six hours, according to circumstances, or until thorough decomposition and reaction have taken place, and at the end of that time the contents of the vessel are discharged into a settling-tank by opening the valve in the discharge-pipe. In this tank are separated by precipitation the insoluble carbonate of lime and foreign matters or substances, and the clear solution is afterward run off into crystallizers for final treatment in the usual manner.

Instead of dissolving the carbonate of soda in water, the mother-liquor from the crystallizers may be utilized in producing the carbonate-of-soda solution.

The vessel A for carrying on the process should have an opening to admit the mixture and a cover with a screw-clamp for tightly closing it. In the center of the vessel is a fixed tube or cylinder B in upright position, with the lower end standing clear of the bottom and the upper end terminating in a sliding section B*, both ends of the tube being open. A spiral propeller C is mounted for rotation in the lower part of the fixed tube and is connected with suitable mechanism outside the vessel for giving it a rapid rotation. The means here illustrated consists of the shaft $d$, that is carried through the middle of the tube and out through a stuffing-box $e$ in the head of the vessel, and the gearing F, by which this propeller-shaft is connected with a driving-shaft for continuous rotation. The lower end of the propeller-shaft is stepped in a bearing $f$.

The purpose of the sliding section B* is to regulate the height of the top of the tube above the level of the mixture, and for adjusting it there is provided the rod $b^2$, passing from the outside through a stuffing-box in the head of the vessel and attached to the sliding tube-section, and as means for moving it the rod terminates in a rack $b^3$, that engages with a pinion $b^4$ on a short shaft $b^5$.

The discharge-pipe G leads upward from the bottom of the vessel and out through the top and is furnished with a valve $g$. When the pipe is opened to the atmosphere, the entire liquid and solid contents of the vessel are discharged by the steam-pressure in the vessel. In connection with this vessel for working under pressure there is required a mixing-tank H and a settling-tank I, the former having a supply-pipe $h$ to conduct the mixture in the boiling-vessel and the latter conveniently placed to receive the contents of the vessel from the pipe G.

In working the harder forms of borate of lime as found in some localities—such as boracite or pandermite or colemanite — I separate the borates after they have received the usual grinding or crushing into different grades of uniform size of particles, one grade composed of the coarser particles and another grade composed of finer particles. This is accomplished by means of any suitable bolting apparatus. After this treatment, the material being ready for the mixing operation preparatory to boiling, the carbonateof-soda solution is prepared of the full strength which is found to be required for the whole charge of borates to be worked if it were to be decomposed and otherwise operated on at the one time, and into this solution the charge or quantity consisting of the coarser particles of the borates is introduced, and the mixture is boiled until decomposition takes place. When this point or stage in the operation is reached, the finer, and consequently the least refractory, portions of the borates is introduced into the vessel without interrupting the process. This charge of the finer particles can be introduced into the boiling mixture by providing a pump J, having a conducting-pipe $j$, leading into the vessel, and the suction side of the pump connected with a tank, in which is placed the charge of finer particles mixed with water to a consistency suitable to be drawn into and be forced through the pump.

By preparing and working the borates in the above-described manner a rapid and thorough decomposition of the more refractory forms of the natural product is obtained without the expense and labor of reducing them to a fine powder by a special grinding operation, as has heretofore been done.

It should be mentioned that a reagent composed of carbonate of soda and a proportion of the bicarbonate of soda—such as is sometimes used in working under present methods—can be employed to advantage in this process, and in such case I should recommend the proportions of about eleven hundred pounds carbonate of soda to about eight hundred and eighty pounds of the bicarbonate of soda. Such mixture can be used in place of the carbonate-of-soda solution hereinbefore mentioned, and in this description of the process I wish to be understood as including also the use of a mixture of a carbonate of soda and its bicarbonate instead of the carbonate-of-soda solution.

Having thus fully described my invention, what I claim, and desire to secure by Letters Patent, is—

1. The herein-described method or process of manufacturing borax from borate of lime and carbonate of soda, which consists in mixing the borate of lime with the carbonate-of-soda solution, then boiling the mixture in a closed vessel under pressure and keeping the contents of the vessel in constant agitation or circulation until decomposition takes place, and finally drawing off the resulting liquid and solid contents into settlers and crystallizers, wherein the operations of separating the insoluble carbonate-of-lime product and of obtaining the borate-of-soda crystals are carried on.

2. In the manufacture of borax from borate of lime and carbonate of soda, the herein-described method of treating and operating on the borates, which consists in dividing the whole quantity or charge of borates into separate grades or portions of coarse particles and finer particles, then introducing the charge or quantity composed of the coarse particles into carbonate-of-soda solution prepared of the full strength that would be required to work the whole charge or quantity of borates at once, then boiling the mixture, and afterward introducing the portion or charge of borates which is composed of the finer particles while the operation of boiling continues, substantially as hereinbefore set forth.

3. The herein-described improvement in the art of manufacturing borax from borate of lime and carbonate of soda, which consists in subjecting a solution of these materials to pressure in a closed vessel during boiling and keeping the same in a state of active agitation, substantially as set forth.

In testimony that I claim the foregoing I have hereunto set my hand and seal.

NEWTON M. BELL. [L. S.]

Witnesses:
EDWARD E. OSBORN,
CHAS. E. KELLY.